United States Patent [19]  
Ramey et al.

[11] 3,875,086  
[45] Apr. 1, 1975

[54] URETHANE CONTAINING MONOHYDRIC POLYETHER CHAIN STOPPERS

[75] Inventors: Bobbie Joe Ramey; Michael Cuscurida, both of Austin, Tex.

[73] Assignee: Jefferson Chemical Company, Inc., Houston, Tex.

[22] Filed: Aug. 10, 1973

[21] Appl. No.: 387,435

[52] U.S. Cl. ............... 260/2.5 AM, 260/77.5 MA
[51] Int. Cl. .................. C08g 22/46, C08g 27/16
[58] Field of Search............ 260/77.5 MA, 2.5 AM, 260/2.5 AG, 18 TN

[56] References Cited
UNITED STATES PATENTS

| | | | |
|---|---|---|---|
| 3,272,098 | 9/1966 | Buchholtz | 260/37 N |
| 3,384,623 | 5/1968 | Inoue | 260/77.5 MA |
| 3,391,101 | 7/1968 | Kelly | 260/18 TN |
| 3,425,973 | 2/1969 | Shaw | 260/77.5 MA |
| 3,489,698 | 1/1970 | Morehouse | 260/2.5 AG |

FOREIGN PATENTS OR APPLICATIONS

| | | | |
|---|---|---|---|
| 1,079,256 | 8/1967 | United Kingdom | 260/2.5 AG |
| 1,012,644 | 12/1965 | United Kingdom | 260/77.5 MA |

OTHER PUBLICATIONS  
Chemical Abstracts, Vol. 78, 98482s, 1973.

*Primary Examiner*—Melvyn I. Marquis  
*Assistant Examiner*—C. Warren Ivy  
*Attorney, Agent, or Firm*—James L. Bailey; John R. Kirk, Jr.; Terrence Dean Dreyer

[57] ABSTRACT

The use of a monohydroxy polyether chain stopper having a hydroxyl number of from about 20 to about 112 prepared by reacting a monohydroxy initiator with propylene oxide or propylene oxide and ethylene oxide to reduce and control the hardness of polyurethane elastomers and to improve the flowability of the reactants used to produce flexible polyurethane foams is disclosed.

13 Claims, No Drawings

URETHANE CONTAINING MONOHYDRIC POLYETHER CHAIN STOPPERS

BACKGROUND OF THE INVENTION

The field of this invention relates to polyurethane materials, particularly polyurethane elastomers and flexible polyurethane foams. Flexible foams are characterized by those in the art as being foams which will return to their original shape as opposed to rigid foams which, once deformed past their yield point, do not recover and are permanently deformed.

When an organic polyisocyanate A-component is reacted with a polyether polyol-containing B-component to produce a polyurethane composition, various compounds are introduced into the system in order to adjust the physical properties of the resulting polyurethane composition. For example, if a cellular product is desired, water or an appropriate blowing agent is added to the polyurethane reaction mixture. In order to adjust properties of various polyurethane compositions such as tensile strength, elongation, tear strength, flexibility, or color, various other additives are used. Often the addition of an additive to improve one particular property results in the degradation of other properties of the polyurethane composition. For example, an additive which increases the tensile strength of a solid polyurethane elastomer composition, such as various fillers, for example, may result in a decrease in the elongation of the resulting polyurethane composition and an undesirable increase in the hardness of said composition.

Solid polyurethane elastomer compositions have found usefulness in recreational surfaces, sealants, gaskets, caulks, textile covering elastomers, floor coverings, molding materials, and the like. Flexible cellular polyurethane compositions have found usefulness in beddings, seat cushions, molded integral skin products such as automobile seats and crash pads and the like. Many of the present uses of flexible cellular polyurethane compositions require that the urethane reactants be introduced into a mold to produce the product. In so doing, it is necessary to insure that the product used has good flowability such that the mold is filled to produce a consistent urethane composition in order to reduce the number of rejected parts because of poor production techniques. Previously, additives used to improve the flowability of the reactants used to make the molded flexible polyurethane product have also detrimentally reduced the other desirable strength characteristics of the polyurethane composition.

In like manner also, efforts which involve the addition of certain chain stoppers to polyurethane elastomer compositions in order to reduce the hardness of such compositions have also caused a consequent unacceptable loss in strength, particularly tensile strength. Previously used monofunctional chain stoppers are low molecular weight materials such as butyl cellosolve (mono-butyl ether of ethylene glycol) which has a hydroxyl number of about 474 and butyl carbitol (hydroxyl number of 346), as described in U.S. Pat. No. 3,272,098. It has also been attempted to use such low molecular weight materials as diethylene glycol monoethyl ether, for example. Another detrimental factor which evolves from the use of these prior art low molecular weight chain stoppers to control the hardness of a solid polyurethane elastomer composition has been the increase in the sensitivity of the hardness of the elastomer to the mix ratio between the A-component and B-component used in the system. It has been found that when these prior art low molecular weight materials (high hydroxyl number) were used, small changes in the mix ratio cause large variations in the hardness of the resulting composition. This is undesirable since, for specific applications, solid elastomer polyurethane compositions require a fairly consistent hardness. For example, many solid elastomer polyurethane systems are mixed and reacted on the site where they are to be used and are allowed to cure without the benefit of rigidly controlled specifications and equipment as is found with material produced in a plant. Since on-site preparations are made in many varying conditions and locations, it is necessary that the sensitivity of the system involved be minimized.

It is, therefore, an object of this invention to provide a chain stopper which allows the control of hardness of solid polyurethane elastomer compositions while maintaining the strength properties of the system and minimizing the effects of small variations of the mix ratio between the A-component and B-component. It is a further object of this invention to provide a monohydric chain stopper which improves the flowability of the reactants used to produce flexible polyurethane foams while maintaining the physical properties of such cellular polyurethane products.

The advantages and other objects of our invention will become apparent to those skilled in the art in view of the aforementioned background, the following discussion and accompanying Examples.

SUMMARY OF THE INVENTION

Our invention relates to the production of polyurethane compositions wherein the hardness of solid polyurethane elastomers is controlled by the inclusion in the B-component of from 0.1 wt. percent to about 50 wt. percent of a monohydroxy polyether chain stopper having a hydroxyl number of from about 20 to about 112 prepared by reacting a low molecular weight monohydroxy initiator with propylene oxide or propylene oxide and ethylene oxide wherein said propylene oxide comprises at least about 50 percent by weight of the oxide added to said monohydroxy initiator.

Our invention is more particularly directed to improved solid polyurethane compositions and the control of the hardness thereof by adding the above-mentioned monohydroxy polyether chain stopper. This results in lowering the hardness of the elastomer and increasing the elongation thereof without consequently unacceptably reducing the tensile or tear strength of the composition.

Our invention also provides a means whereby the flowability of a formulation used to produce molded flexible cellular polyurethane compositions is improved without altering the physical properties of said polyurethanes. The chain stopper of our invention is incorporated into the B-component of the reaction mixture of an organic polyisocyanate A-component and the B-component containing a polyether polyol.

DESCRIPTION OF THE PREFERRED EMBODIMENTS

The hardness of solid polyurethane elastomer compositions prepared by reacting an organic polyisocyanate A-component with a polyether polyol-containing B-component is reduced and controlled by incorporating into said B-component from 0.1 wt. percent to about 50 wt. percent and preferably from 1 wt. percent to about 25 wt. percent, of a monohydroxy polyether chain stopper having a hydroxyl number of from about 20 to about 112, preferably from about 30 to about 70. In the production of elastomers and cellular flexible polyurethane compositions, the polyether polyols used generally have hydroxyl numbers in the range of from about 20 to about 112 and preferably from about 25 to about 60. We have discovered that the selection of a polyether chain stopper of similar hydroxyl number contributes to the success of this invention. Even with the addition of small amounts of the above-defined polyether chain stopper, advantages of the invention are accomplished.

The monohydroxy polyether chain stopper used in the practice of our invention to reduce the hardness of solid polyurethane compositions and to increase the elongation of said compositions without disadvantageously reducing the tensile and tear strength is prepared by reacting a monohydroxy initiator with propylene oxide or propylene oxide and ethylene oxide wherein said propylene oxide comprises at least about 50% by weight of the oxide added to said monohydroxy initiator.

In the production of the monohydroxy polyether chain stopper used in the practice of our invention, the low molecular weight monohydroxy initiator may be either an aliphatic alcohol having from 1 to about 8 carbon atoms, preferably 1 to about 4 carbon atoms, in the aliphatic hydrocarbon chain, or an alkylene glycol mono-lower alkyl ether compound such as ethylene glycol monomethyl ether, ethylene glycol monobutyl ether (butyl cellosolve), propylene glycol monomethyl ether, propylene glycol monoethyl ether, diethylene glycol monobutyl ether (butyl carbitol), and the like. The alkylene glycol would have 2 to about 4 carbon atoms and the lower alkyl group from one to about four carbon atoms. The alkyl chains of the foregoing initiators can either be linear or branched. Propylene oxide or propylene oxide and ethylene oxide are reacted, either in a single step or in a plurality of steps, with the monohydroxy initiator in the manner well-known to those of ordinary skill in the art. However, by way of illustration and not limitation, the following description is given for the preparation of a preferred monohydroxy chain stopper prepared from an ethylene glycol monomethyl ether initiator.

ILLUSTRATIVE PREPARATION OF A MONOHYDROXY POLYETHER CHAIN STOPPER

The chain stopper was prepared by a two-step reaction which first involved the preparation of a 147 hydroxyl number propylene oxide adduct of ethylene glycol monomethyl ether. This intermediate was then used as the initiator to prepare a preferred polyether chain stopper of this invention using the following procedure.

Into a 10-gallon kettle were charged 10 lb. of the 147 hydroxyl number propylene oxide adduct of ethylene glycol monomethyl ether and 300 g. aqueous potassium hydroxide. The reactor was then evacuated and purged with prepurified nitrogen. The reaction mixture was then heated to 100°C. and stripped to a minimum pressure. This was followed by nitrogen stripping for one-half hour. Propylene oxide (39.6 lb.) was then reacted at 105°–110°C. at 60 psig. Approximately 5.5 hours was required for addition of the propylene oxide. After digestion to an equilibrium pressure, the reaction mixture was purged 30 minutes with nitrogen. Ethylene oxide (5.5 lb.) was then reacted at 105°–110°C. After digestion to an equilibrium pressue, the alkaline product was neutralized at 95°C. with 1150 g. 25 percent aqueous oxalic acid. Hyflo Supercel (150 g.) (filter aid) and di-t-butyl p-cresol (22.5 g.) (antioxidant) were also added at this time. The neutralized product was then vacuum stripped to a minimum pressure at 110°C., nitrogen stripped for ½ hour, and filtered at 110°–120°C. The finished product had the following properties.

| Property | |
|---|---|
| Acid no., mg. KOH/g. | 0.01 |
| Hydroxyl no., mg. KOH/g. | 30 |
| Water, wt.% | 0.024 |
| Unsaturation, meq./g. | 0.08 |
| Color, Pt-Co | 30 |
| pH in 10:6 i—PrOH:$H_2O$ | 7.4 |
| Sodium, ppm. | 0.1 |
| Potassium, ppm. | 1.3 |

Following the foregoing description of the preparation, any of the monohydroxy initiators can be used with the proviso that when propylene oxide and ethylene oxide both are reacted to form the polyether chain, the olefin oxide added will comprise at least about 50 percent by weight propylene oxide and preferably from about 75 percent to about 95 percent by weight propylene oxide.

The other essential ingredient of the B-component in the practice of our invention is the polyether polyol. Polyether polyols useful in the practice of our invention are those diols, triols, tetrols and mixtures thereof having a molecular weight of from about 1,000 to about 7,000 which are generally used in the production of polyurethane elastomers and flexible foams. The diols are generally polyalkylene ether glycols such as polypropylene either glycols, polybutylene ether glycols, mixed glycols produced from ethylene oxide and propylene oxide, and the like, and mixtures thereof. Mixed polyether polyols can also be used such as the condensation products of an alkylene oxide with a polyhydric alcohol having three or four hydroxyl groups such as glycerol, trimethylolpropane, 1,2,6-hexanetriol, pentaerythritol, and the like. These polyether polyols are well-known and may be prepared by a known process such as, for example, the processes discussed in *Encyclopedia of Chemical Technology*, volume 7, pages 257–262, published by Interscience Publishers, Inc. in 1951.

As mentioned above, any suitable polyhydric polyalkylene ether polyol may be used, such as, for example, the condensation product of the alkylene oxide with a polyhydric alcohol. Any suitable polyhydric alcohol may be used as an initiator, such as, for example, ethylene glycol, 1,2-propylene glycol, 1,3-propyene, glycol, 1,4-butylene glycol, 1,3-butylene glycol, glycerine, trimethylolpropane, 1,2,6-hexanetriol, pentaerythritol, and the like. Suitable alkylene oxides are, for example, ethylene oxide, propylene oxide, butylene oxide, amylene oxide, their various isomers, and the like and mixtures thereof. Especially preferred polyether polyols are those prepared by sequentially adding blocks of propylene oxide and ethylene oxide to the initiator such as is described in U.S. Pat. Nos. 3,535,307 and 3,594,352, for example. Of course, the polyhydric polyalkylene ether polyols can be prepared from other starting materials such as, for example, tetrahydrofuran, epihalohydrins and arylalkylene oxides such as, for example, styrene oxide, and the like. Polyhydric polyether polyols having three or four hydroxyl groups per molecule and a molecular weight of from about 2,000 to about 7,000 can be used. In the production of flexible foams and elastomer compositions, the polyether diols, triols, tetrols, and mixtures thereof used generally have hydroxyl numbers of from about 20 to about 112, corresponding generally to the above molecular weights. The polyether polyols preferably used in this invention have hydroxyl numbers from about 25 to about 60. In the practice of this invention, the polyether chain stopper used in a particular case would correspond generally with the hydroxyl number of the polyether polyol used, particularly at the extremities of the range, i.e., the higher hydroxyl numbers (lower molecular weights). The preferred range of hydroxyl number for the polyether chain stopper, corresponding to the preferred range for the polyether polyol, is from 30 to about 70.

The polyol used can be a blend of diols with triols or tetrols to produce a polyol blend having an average molecular weight of from about 1,000 to about 7,000. Blended diols and triols for use in solid polyurethane elastomers is generally discussed in U.S. Pat. No. 3,391,101. Most preferred for use either alone or blended with a diol are the polyether triols and tetrols having a molecular weight of from about 4,500 to about 7,000.

This invention has special applicability when solid elastomer compositions are produced using diols such as polypropylene glycols as the polyether polyol since these elastomers are often undesirably hard. The high hardness can be reduced through the practice of this invention without lowering the desired properties of the elastomer. Preferred polyether diols are those having a molecular weight of from about 2,000 to about 4,000.

The polyether polyols may have a primary or secondary hydroxyl group termination. When the polyhydric alcohol is reacted with an alkylene oxide such as propylene oxide, butylene oxide, and the like, the terminal groups are predominantly secondary hydroxyl groups. However, it is within the scope of our invention to use polyether polyols which have from about 5 to 15 wt. percent ethylene oxide added thereto in a final alkoxylation step by the known processes in order to increase the terminal primary hydroxyl content of the said polyether polyol. While high primary hydroxyl termination is not necessary, the polyether polyols used in the practice of this invention may contain up to about 85 percent primary hydroxyl termination. The amount of primary hydroxyl termination preferred is from about 20 percent to about 65 percent. The manufacture of ethylene oxide "tipped" polyether polyols to provide such primary hydroxyl termination is generally discussed in U.S. Pat. Nos. 3,336,242 and 3,535,307.

The production of solid polyurethane elastomer compositions to which the practice of our invention is particularly applicable is discussed in U.S. Pat. No. 3,594,352 and the production of polyurethane compositions, both elastomeric and flexible cellular, is discussed in U.S. Pat. No. 3,595,814, for example. The disclosure of these patents is hereby incorporated by reference to further aid those skilled in the art for the practice of this invention.

As is pointed out in the aforementioned patents and many other patents describing the production of polyurethane materials, in addition to the organic polyisocyanate A-component and the polyether polyol reactant in the B-component, it is often advantageous, though not entirely necessary, to include other materials in the polyurethane composition, usually in the B-component, in order to produce a polyurethane composition having the properties desired. Some of these materials which may go to make up the B-component, in addition to the polyether polyol and the monohydroxy polyether chain stopper of our invention, are catalysts, pigments, fillers, chain extenders and/or cross-linking agents, plasticizers and ultraviolet stabilizers.

The reaction usually occurs in the presence of known polyurethane catalysts which may be any of the many catalysts known to be useful for this purpose, including tertiary amines and metallic and organo-metallic salts. Suitable tertiary amines include N-methylmorpholine, N-ethylmorpholine, triethylenediamine, triethylamine, trimethylamine and N,N-dimethylethanolamine, for example. Typical organo-metallic and metallic salts are, typically, for example, the salts of antimony, tin, mercury and iron; for example, dibutyltin dilaurate, phenylmercuric acetate and stannous octoate. The catalyst is usually employed in a proportion of from about 0.01 percent to 2 percent by weight based on the weight of the overall composition. However, the selection of the amount of catalyst, and the catalyst system to employ is not critical to the practice of our invention and is well within the skill of the ordinary practitioner.

Various additives can be employed to provide different properties, e.g., fillers such as clay, calcium carbonate, talc, titanium dioxide, barium sulfate, calcium silicate, diatomaceous earth, and the like. Dyes and pigments may be added for color and antioxidants also may be used. The use of such fillers, dyes and pigments are well-known.

The use of an optional chain extender or cross-linking agent provides additional reactive sites which, depending upon the functionality and molecular weight, can be used to vary properties of the final polyurethane composition. The variation of the crosslinker content adds versatility to the basic material. Normally, such a cross-linking agent or chain extender would be added to the B-component to maintain the integrity of a one-shot reaction system wherein the A- and B-components are simultaneously mixed and reacted. Suitable crosslinking agents for use in the practice of our invention are described in U.S. Pat. Nos. 3,595,814 and 3,594,352, for example. The examples of such materials which may be used in the practice of our invention are materials such as glycols, diamines, amino alcohols or mixtures thereof, and particularly preferred are the monocarbamate chain extenders of the type described in U.S. Pat. No. 3,595,814, previously mentioned, for example, 2-hydroxyethyl 2-hydroxypropyl carbamate.

When the embodiment of our invention is practiced which involves the production of cellular polyurethane products, a blowing agent is employed which may be any of those known to be useful for this purpose such as water, the halogenated hydrocarbons, and mixtures thereof. Typical halogenated hydrocarbons include, but are not limited to, monofluorotrichloromethane, difluorodichloromethane, 1,1,2-trichloro-1, 1,2-trifluoroethane, methylene chloride, and the like. The amount of foaming agent employed may be varied within a wide range. Generally, however, the halogenated hydrocarbons are employed in an amount from 1 to 25 parts by weight per 100 parts by weight of the polyol used in the production of the polyurethane composition. When water is employed as the blowing agent, it is usually present in the amount of from 0.1 to 5 parts by weight per 100 parts by weight of the polyether polyol. Halogenated hydrocarbon blowing agents for use in the production of a foamed polyurethane composition are discussed in U.S. Pat. No. 3,072,582.

In the foregoing embodiment, we have discovered that the blend of the reactants used to make the cellular flexible polyurethane composition have much better flowability when used to manufacture molded flexible polyurethane foams, particularly those foams which have become to be known in the art as integral foams used as crash pads and highly resilient flexible foams used primarily as automobile seats. See, for example, the patents mentioned above. The practice of this invention relates particularly to the highly resilient flexible foams having a density of from about 2 to about 5 pounds per cubic foot. Also, this invention has applicability to other flexible foams, including slabstock foams all the way to molded integral skin foams, having densities as high as 30 pounds per cubic foot.

Other ingredients which go to make up the B-component, such as antioxidants and the like, are well-known to those skilled in the art and described, for example, in "Polymer Additives Guidebook and Directory-1972," Noyes Data Corporation.

As stated above, the B-component previously described is reacted with an organic polyisocyanate A-component in order to produce the polyurethane compositions of our invention. Suitable organic polyisocyanates are those organic diisocyanates, triisocyanates and polyisocyanates well-known to those skilled in the polyurethane art. Mixed isomers of toluene diisocyanate which are readily available commercially, such as those described in U.S. Pat. No. 3,298,976 and the like, may be used. Especially preferred are diisocyanates and higher functionality polyisocyanates prepared by the phosgenation of the reaction product of aniline and formaldehyde, such as diphenylmethane diisocyanate in its various isomeric forms and higher functionally polymethylene polyphenyl polyisocyanates such as those described in U.S. Pat. No. 3,362,979, for example. These polymethylene polyphenyl polyisocyanates generally have an average functionality of from greater than 2.0 to about 3.3. An especially preferred organic polyisocyanate useful in the practice of our invention are the polymethylene polyphenyl polyisocyanates having a functionality from about 2.2 to about 2.8.

In producing the polyurethane compositions of our invention, the A-component and B-component are combined such that the resulting ratio of isocyanate groups in the A-component to hydroxyl groups in the B-component, known as the isocyanate index, ranges from about 0.9:1 to about 1.4:1. It is preferred that the isocyanate index ranges from about 0.95:1 to about 1.3:1. It is within these ranges that the most desirable balance of advantageous physical properties and ambient temperature curing properties are achieved for solid polyurethane elastomer products. As mentioned hereinbefore, it is a particular advantage, using the monohydric polyether chain stopper of our invention, that variation of the isocyanate index, either accidentally or on purpose, does not result in great variation of the hardness of a resulting urethane elastomer composition as would result from the use of prior art chain stoppers. The previously mentioned advantages of the practice of our invention will be described further by way of the following specific examples in which the details are given by way of illustration and should not be construed as limitations of the invention, since many obvious modifications thereof may be made by those of skill in the art after having read the foregoing disclosure and following examples.

EXAMPLE 1

This example illustrates the preparation of a B-component and an elastomer in the absence of the chain stopper of our invention. The B-component was prepared by the following steps: (a) 820 g. THANOL SF-6500[1], 1640 g. THANOL E-4003[2], 1199 g. calcined clay, 133 g. talc, and 8 g. burnt umber pigment were well-blended in a 1-gallon can. (b) The blended mixture was transferred to a 4-liter suction flask equipped with heater, thermometer, and vacuum source. The mixture was stripped of moisture by heating it under maximum pump vacuum to a temperature of 125°C with agitation. (c) After stripping, the blend was cooled to a temperature of 75°C. (d) The vacuum was discontinued and 66 g. 2-hydroxyethyl 2-hydroxypropyl carbamate, 8.5 g. phenylmercuric propionate catalyst, and 5.04 g. DBPC antioxidant were added. (e) The mixture was cooled to room temperature under vacuum and with shaking. The resultant B-component thus had the weight percent composition shown below in Table I.

TABLE I

| Ingredient | Amount (wt.%) |
| --- | --- |
| THANOL SF-6500[1] | 21.1 |
| THANOL E-4003[2] | 42.3 |
| Calcined clay | 30.9 |
| Talc | 3.4 |
| Burnt umber pigment | 0.2 |
| 2-hydroxyethyl 2-hydroxypropyl carbamate | 1.7 |
| Catalyst | 0.2 |
| DBPC (di-tertiarybutyl-para cresol) | 0.1 |

[1]A 6500 molecular weight propylene oxide and ethylene oxide adduct of trimethylolpropane having about 50% primary hydroxyl groups - Jefferson Chemical Company, Inc.
[2]A polyoxypropylene/polyoxyethylene glycol having a molecular weight of about 4,000 and about 50% primary hydroxyl groups - Jefferson Chemical Company, Inc.

An elastomer was prepared by combining, by stirring in a container, the B-component with a polymethylene polyphenyl isocyanate A-component having a functionality of about 2.2, using an A/B weight ratio of 7.9/100, and allowing the mixture to cure at room temperature. The Shore A2 instant hardness was measured as 53–54 after 16 hours of cure and was measured at 53–54 after 42 days. The following physical properties were found: 504 psi tensile stength, 304% elongation, 86 pli tear strength (Die C).

EXAMPLE 2

This example describes the preparation of a B-component made for subsequent blending. The procedure and ingredients of Example 1 were repeated with the single change being that all the THANOL E-4003 used in Example 1 was replaced by an equal weight of the monohydric polyether chain stopper as prepared in the illustrative preparation.

EXAMPLE 3

A blend containing 30 wt. percent of the B-component of Example 2 and 70 wt. percent of the B-component of Example 1 was made which thus contained 12.7 wt. percent of the monohydric polyether chain stopper. This blend was used to prepare an elastomer using the procedure of Example 1 and the same 7.9/100 A/B weight ratio. The following physical properties were found on the cured elastomer: Shore A2 instant hardness of 27–28, 401 psi tensile strength, 707 percent elongation, and 83 pli Die C tear strength. Thus, by replacing about 30 percent of the THANOL E-4003 of the composition shown in Table I by our 30 hydroxyl number chain stopper, we were able to greatly lower the hardness and greatly increase the elongation of the resultant elastomer and do so without changing the A/B mix ratio and with relatively little sacrifice of tensile strength or tear resistance. Table II is a comparison of the physical properties of the two elastomers:

TABLE II

|  | Example 1 | Example 3 |
| --- | --- | --- |
| Shore A2 hardness | 53–54 | 27–28 |
| Tensile, psi | 504 | 401 |
| Elongation | 304% | 707% |
| Tear, pli | 86 | 83 |

EXAMPLE 4

This example shows that the control of hardness by the use of our invention does not cause undue sensitivity of hardness to the A/B ratio. A blend of 15 wt. percent of the B-component of Example 2 and 85 wt. percent of the B-component of Example 1 was prepared, resulting in a B-component containing 6.3 wt. percent of the chain stopper prepared as illustrated previously. The blend was used to prepare elastomers as in Example 1, but in addition to the usual 7.9/100 A/B ratio, a 7.9/95 and a 7.9/105 A/B wt. ratio were also used. Results are shown in Table III, below:

TABLE III

| A/B ratio: | 7.9/95 | 7.9/100 | 7.9/105 |
| --- | --- | --- | --- |
| Instant Shore A2 hardness: | 43 | 40 | 35–36 |

Thus, a hardness variation range of only 7–8 Shore A2 units was found by using 95 percent to 105 percent of the usual amount of B-component.

EXAMPLE 5

This example illustrates the preparation of a B-component and elastomer absent a chain stopper. A subsequent example will illustrate the use of prior art chain terminating agents for hardness control. The procedure of Example 1 was used to prepare a B-component having the composition of Table IV, below:

TABLE IV

| Ingredient | Amount (wt.%) |
| --- | --- |
| THANOL SF-6500 | 20.2 |
| THANOL E-4003 | 40.4 |
| Calcined clay | 32.0 |
| Talc | 3.6 |
| Iron oxide pigments | 1.8 |
| 2-hydroxyethyl 2-hydroxypropyl carbamate | 1.6 |
| Phenylmercuric propionate | 0.2 |
| DBPC | 0.1 |

An elastomer prepared by combining the B-component with the polymeric isocyanate A-component as used in Example 1 at an A/B weight ratio of 7.6/100 gave a final Shore A2 instant hardness of 57.

EXAMPLE 6

This example illustrates the use of a prior art chain stopper. A mixture of 4600 g. of a B-component having the composition shown in Table IV and 12.42 g. of diethylene glycol monoethyl ether additive was blended well. Elastomers were then prepared as in Example 5 except that the A/B ratios of 7.6/95, 7.6/100, and 7.6/105 were used with the additive-containing B-component. Results are shown in Table V, below:

TABLE V

| A/B ratio: | 7.6/95 | 7.6/100 | 7.6/105 |
| --- | --- | --- | --- |
| Instant Shore A2 hardness: | 46 | 40 | 33 |

Comparing results of Table V with those of Table III it is seen that a variation of ±15 percent in the B-component weighing leads to a 13 Shore A2 hardness variation whereas the use of our invention (Table III, Example 4) gave a much less sensitive system.

EXAMPLE 7

This example illustrates the preparation of a B-component and an elastomer and utilizes a polypropylene glycol having a molecular weight of about 2,000 as the polyol. Subsequent examples will illustrate the use of the chain stopper of our invention in combination with the instant B-component to obtain softer elastomers. The B-component was prepared by the following steps: (a) 1000 g. polypropylene glycol, molecular weight about 2,000, 494 g. calcined clay, 55 g. talc, and 3 g. burnt umber pigment were well blended in a 1-gallon can. (b) The blended mixture was transferred to a 4-1 suction flask and was stripped of moisture by heating it under maximum pump vacuum to a temperature of 125°C. with agitation. (c) The stripped mixture was cooled to a temperature of 75°C. (d) The vacuum was discontinued and 2.30 g. phenylmercuric propionate catalyst and 2.00 g. DBPC antioxidant were added. (e) The mixture was cooled to room temperature under vacuum and with shaking.

Three solid polyurethane elastomer compositions were prepared by reacting the B-component with a polymethylene-polyphenylisocyanate having a functionality of about 2.2. Table VI below shows the reduction of hardness in the elastomers by adding a small amount of the polyether chain stopper of the illustrative preparation.

TABLE VI

| Elastomer | A | B | C |
| --- | --- | --- | --- |
| B-component, gm. | 50.0 | 50.0 | 50.0 |
| Chain stopper, gm. | — | 1.0 | 3.0 |
| A/B weight ratio | 10.4/100 | 10.4/100 | 10.2/100 |
| Instant Shore A2 hardness (time of cure) | 62(17 hrs.) 63(7 days) | 55(3 days) | 47(3 days) |

EXAMPLE 8

This example will illustrate the use of the chain stopper of this invention in the preparation of molded highly resilient foam. It will further show that blending the monofunctional chain stopper with triols normally used in preparation of molded highly resilient foam resulted in a more flowable system as reflected in lower density foam. This is an important consideration in the molding of complex parts. Surprisingly, foams prepared with the monofunctional reactant of this invention had physical properties equivalent to those prepared using only a high reactivity triol (THANOL SF-5503 — a 5,500 molecular weight [hydroxyl number about 31] triol having about 75–85 percent primary hydroxyl groups prepared by reacting propylene oxide and ethylene oxide with trimethylolpropane. Jefferson Chemical Company, Inc.). Formulations, details of preparation, and foam properties are shown in Table VII:

TABLE VII

| | A | B | C |
| --- | --- | --- | --- |
| Formulation, pbw. | | | |
| THANOL SF-5503 | 95 | 90 | 85 |
| Chain stopper[a] | — | 5 | 10 |
| LD-813[b] | 3.5 | 3.5 | 3.5 |
| Water | 3.0 | 3.0 | 3.0 |
| Y-6454 silicone[c] | 1.0 | 1.0 | 1.0 |
| Dibutyltin dilaurate | 0.02 | 0.02 | 0.02 |
| Dabco LV-33[d] | 0.3 | 0.3 | 0.3 |
| N-ethylmorpholine | 0.8 | 0.8 | 0.8 |
| Toluene diisocyanate[e] | 36 | 36 | 36 |
| Isocyanate index | 1.05 | 1.05 | 1.05 |
| Properties | | | |
| Density, pcf. | 3.6 | 3.45 | 3.0 |
| Tensile, psi. | 29 | 38 | 29.5 |
| Elongation, % | 200 | 198 | 208 |
| Tear, pli. | 3.4 | 3.5 | 3.4 |
| Compression set (Method B) | | | |
| 50% | 28.1 | 29.5 | 26.1 |
| 75% | 23.6 | 23.8 | 25.2 |
| Humid aging properties (5 hrs. at 250°F.) | | | |
| Compression set, 50% | 35.9 | 39.1 | 40.3 |
| CLD loss, 50% | 17.3 | 21 | 14.4 |

[a]Hydroxyl No. 30 - Illustrative preparation.
[b]E.I. du Pont de Nemours and Co.: aromatic amine curing agent. eq. wt. 128.
[c]Union Carbide Chemical Corporation.
[d]Air Products and Chemicals; 33% triethylenediamine in dipropylene glycol.
[e]E.I. du Pont de Nemours and Co.: Hylene LD-3020-30.

The foams produced in this example had good cell structure with an absence of voids, indicating that the reactants were well distributed throughout the mold.

We claim:

1. A solid polyurethane elastomer prepared by simultaneously mixing and catalytically reacting, at an isocyanate index of from about 0.9 to about 1.4, an organic polyisocyanate A-component with a B-component comprising a polyether polyol and from 0.1 wt. percent to about 50 wt. percent of the B-component of a monohydroxy polyether chain stopper having a hydroxyl number of from about 20 to about 112 prepared by reacting a low molecular weight monohydroxy initiator with propylene oxide or propylene oxide and ethylene oxide where said propylene oxide comprises at least about 50 percent by weight of the oxide added to said monohydroxy initiator.

2. The solid polyurethane elastomer of claim 1 wherein the polyether polyol is a polyether diol or triol, having an average molecular weight of from about 1,000 to about 7,000 and the isocyanate index is from about 0.95 to about 1.3.

3. The solid polyurethane elastomer of claim 2 wherein the polyether polyol is a polyether diol having a molecular weight of from about 2,000 to about 4,000.

4. The solid polyurethane elastomer of claim 1 wherein the monohydroxy polyether chain stopper has a hydroxyl number of from about 30 to about 70.

5. The solid polyurethane elastomer of claim 4 wherein the monohydroxy polyether chain extender is present in an amount of from about 1 wt. percent to about 25 wt. percent.

6. The solid polyurethane elastomer of claim 5 wherein the organic polyisocyanate is a polymethylene polyphenyl isocyanate having an average functionality of from about 2.2 to about 2.8.

7. The solid polyurethane elastomer of claim 6 wherein the polyether polyol is a mixture of a polyether diol and a polyether triol having a molecular weight of from about 4,500 to about 6,500.

8. A flexible cellular polyurethane composition prepared by simultaneously mixing and reacting, in the presence of a blowing agent, an organic polyisocyanate A-component with a B-component comprising a polyether polyol and from 1.0 wt. percent to about 50 wt. percent of the B-component of a monohydroxy polyether chain stopper having a hydroxyl number of from about 20 to about 112 prepared by reacting a monohydroxy initiator with propylene oxide or propylene oxide and ethylene oxide wherein said propylene oxide comprises at least about 50 percent by weight of the olefin oxide added to the initiator.

9. The flexible cellular polyurethane composition of claim 8 wherein the hydroxyl number of the monohydric polyether chain stopper is from about 30 to about 70 and the hydroxyl number of the polyether polyol is from about 25 to about 60.

10. The flexible cellular polyurethane composition of claim 9 wherein the polyether polyol is a polyether triol and the monohydric polyether chain stopper using propylene oxide and ethylene oxide wherein the propylene oxide is from about 75 wt. percent to about 95 wt. percent of the total olefin oxide.

11. The flexible cellular polyurethane composition of claim 10 wherein the B-component contains from about 1 wt. percent to about 25 wt. percent of the monohydric polyether chain stopper.

12. The solid polyurethane elastomer of claim 5 wherein the monohydroxy initiator is an alkylene glycol mono-lower alkyl ether compound wherein the alkylene glycol has from 2 to about 4 carbon atoms.

13. The solid polyurethane elastomer of claim 7 wherein propylene oxide is from about 75 wt. to about 95 wt. percent of the total olefin oxide added to prepare the monohydroxy polyether chain stopper.

* * * * *